US010203191B2

(12) United States Patent
Berthou et al.

(10) Patent No.: US 10,203,191 B2
(45) Date of Patent: Feb. 12, 2019

(54) CONTROL RING

(71) Applicant: LISI AEROSPACE, Paris (FR)

(72) Inventors: Alexandre Berthou, Bois-Colombes (FR); Martial Broucke, Delincourt (FR); Christophe Payard, Rueil-Malmaison (FR)

(73) Assignee: LISI AEROSPACE, Paris (FR)

( * ) Notice: Subject to any disclaimer, the term of this patent is extended or adjusted under 35 U.S.C. 154(b) by 42 days.

(21) Appl. No.: 15/190,105

(22) Filed: Jun. 22, 2016

(65) Prior Publication Data
US 2016/0377404 A1    Dec. 29, 2016

(30) Foreign Application Priority Data

Jun. 23, 2015   (FR) ...................................... 15 55772

(51) Int. Cl.
*G01B 3/34* (2006.01)
*G01B 3/42* (2006.01)
*G01B 3/36* (2006.01)

(52) U.S. Cl.
CPC ...... *G01B 3/36* (2013.01); *G01B 3/34* (2013.01)

(58) Field of Classification Search
CPC ... G01B 3/34; G01B 3/30; G01B 3/38; G01B 3/42; G01B 3/46; G01B 3/50
USPC ...................................................... 33/501.45
See application file for complete search history.

(56) References Cited

U.S. PATENT DOCUMENTS

| | | | | |
|---|---|---|---|---|
| 2,210,124 A | * | 8/1940 | Parrish ...................... | G01B 3/48 33/501.45 |
| 2,238,515 A | * | 4/1941 | Bath ........................ | G01B 5/08 33/501.45 |
| 2,472,139 A | * | 6/1949 | Emery ..................... | G01B 3/26 33/501.45 |
| 2,536,401 A | * | 1/1951 | Victor ..................... | G01B 3/30 33/567 |

(Continued)

FOREIGN PATENT DOCUMENTS

| | | | |
|---|---|---|---|
| CN | 201680787 U | 12/2010 | |
| EP | 2963378 A1 * | 1/2016 | ............... G01B 3/30 |

(Continued)

OTHER PUBLICATIONS

Grand, Jean-Yves, Preliminary Search Report, dated Apr. 15, 2016, 7 pages, INPI, France.

*Primary Examiner* — Christopher W Fulton
(74) *Attorney, Agent, or Firm* — Henricks Slavin LLP

(57) ABSTRACT

A control ring and a method of using a control ring on fasteners can be used to verify a headed fastener having a band coating a fastener shaft. The ring comprises a cylindrical tubular body extending along an axis of revolution (B) and two opposite extremities. A first extremity includes two adjacent arc segments, each arc segment having an end wall extending in a plane perpendicular to the axis of revolution (B) of the ring, the planes of the two walls not being one and the same and axially offset from the first extremity. Each arc segment comprises at least one side wall extending over a radial plane going through the axis of revolution (B) of the ring. The width of an arc segment allows verifying a minimum band width, and the width of the two arc segments allows verifying a maximum band width on the fastener.

14 Claims, 3 Drawing Sheets

(56) References Cited

U.S. PATENT DOCUMENTS

| | | | | | |
|---|---|---|---|---|---|
| 2,853,786 | A | * | 9/1958 | Ellstrom, Sr. | G01B 3/30 33/567 |
| 5,042,161 | A | * | 8/1991 | Hodge | A61B 5/1076 33/501.45 |
| 5,134,781 | A | * | 8/1992 | Baker | G01B 3/30 33/502 |
| 5,253,427 | A | * | 10/1993 | Bartlett | G01B 3/30 33/501.08 |
| 5,979,071 | A | | 11/1999 | Kim | |
| 7,861,429 | B2 | * | 1/2011 | Lee | G01B 5/06 33/501.45 |
| 2009/0307919 | A1 | | 12/2009 | Lee | |
| 2015/0033570 | A1 | * | 2/2015 | Bernabe | G01B 3/34 33/555.1 |
| 2015/0226534 | A1 | * | 8/2015 | Rodriguez | G01B 3/38 33/501.45 |
| 2016/0083109 | A1 | | 3/2016 | Regnard et al. | |

FOREIGN PATENT DOCUMENTS

| | | | | |
|---|---|---|---|---|
| FR | 3008754 | | 1/2013 | |
| FR | 3013781 | A1 | 5/2015 | |
| WO | WO 2016109247 | A1 * | 7/2016 | G01B 21/042 |

\* cited by examiner

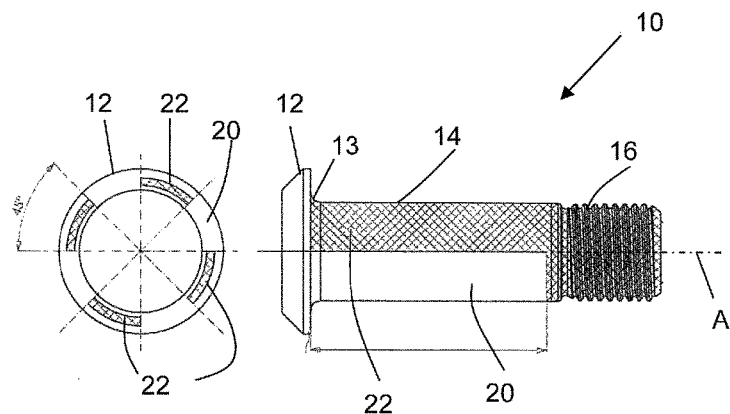
FIG. 1A
(Prior Art)
FIG 1B
(Prior Art)
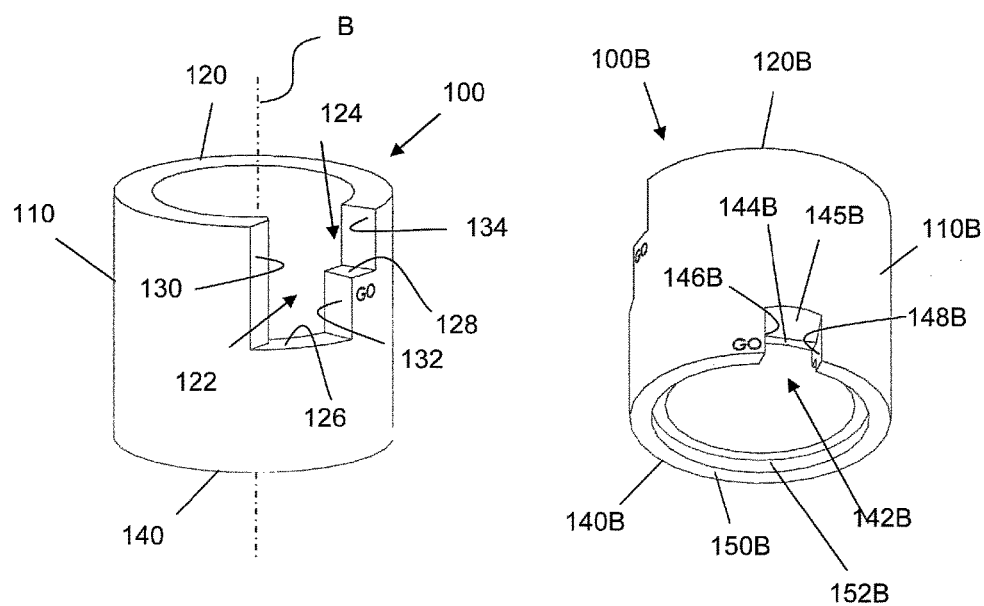
FIG. 2
FIG 3

CONTROL RING

BACKGROUND

The present invention relates to a control gauge designed to verify, on exiting a manufacturing line, that the dimensional characteristics of a fastener comply with the fastener's design plan. More specifically, the invention relates to a control ring for a fastener of the type comprising an enlarged head and a cylindrical shaft extending along an axis, the shaft comprising at least one band of coating parallel to or in the direction of the axis. Such a fastener is described in application FR 3 008 754 and represented in FIGS. 1A and 1B, published in US2016/0083109, incorporated herein by reference. This type of fastener is used to assemble metal and composite structures in airplanes.

FIGS. 1A and 1B represent a metal fastener 10 of the aforementioned type, respectively in end and side views, comprising a protruding head 12, a cylindrical shaft 14, and a threaded portion 16. In variants, the fastener can comprise a pulling stem that makes it possible to pull on the fastener to insert it by interference in a previously-drilled structure. This stem may be an integral part of the fastener 10, or removable by means of a threaded extremity inserted into a tapped extremity made inside the threaded portion 16. In variants, the threaded portion can be replaced by annular crimping grooves. In variants, the head 12 can be countersunk.

The shaft 14 is designed to come into tight contact in a hole made in a set of structures comprising one or more metal and/or composite materials, and comprises four conducting portions 20, i.e. which do not comprise any coating or paint to prevent an electrical current from flowing between the conducting portion of the shaft and the wall of the hole. The shaft also comprises four lubrication bands 22, arranged parallel to the axis of revolution A of the fastener. Each lubrication band 22 extends over the shaft 14 and over a portion beneath the head 12, over a distance X. The conducting 20 and lubrication 22 portions are arranged alternately around the circumference of the shaft, as shown in FIG. 1A. In this way, electrical conduction is provided over the entire thickness of the assembled structure, irrespective of the composition of the structure wherein the fastener is inserted. The lubrication portions 22 make it possible to provide lubrication of the shaft 14 over its entire height, such that the fastener can be installed by interference without jamming or breaking.

The lubricant used may be a solid $MoS_2$ type of film, or an organic resin with aluminum pigments, such as the HI-KOTE™ 1 or HI-KOTE™ 1NC coatings, both of which are dielectric, marketed by Hi-Shear Corp. in Torrance, Calif. The lubricant is deposited with a thickness of 5 to 13 μm, for example by pulverization, over an axial length and width specified in the design plan of the fastener 10.

Irrespective of the means of manufacturing of a fastener 10 and of the means of depositing the lubrication bands 22, the dimensional characteristics of these bands—particularly the lengths and widths—must be measured and compared with those of the fastener's design plan to ensure their compliance.

Various dimensional measurement means are known that make it possible to verify the dimensions of the bands 22, which are specified in the fastener's design plan.

A first means is a 3D means, which makes it possible to verify the dimensions by palpation of the fastener. A second known means is a computerized means comprising a camera that films the fasteners and analyzes the images in comparison with a reference image.

These means are reliable, but expensive to buy and maintain, bulky, fragile, and require specially-trained staff.

One objective of the present application is to provide a means for dimensionally verifying the lengths and widths of the lubrication bands of fasteners of the prior art that is easy to manufacture, simple and quick to use, that suffers little from wear and that is reliable.

SUMMARY

The purpose of the invention is therefore a control ring designed to verify a fastener comprising an enlarged head and a cylindrical shaft extending along an axis, the shaft comprising at least one band of coating parallel to the axis, the band extending over a circumferential width.

The ring comprises a cylindrical tubular body extending along an axis of revolution between a first extremity and a second extremity, characterized in that:
the first extremity comprises two adjacent arc segments, each arc segment having an end wall extending in a plane perpendicular to the axis of revolution of the ring, the planes of the two walls not being one and the same and being axially offset from the first extremity; and
each arc segment comprises at least one side wall extending over a radial plane going through the axis of revolution of the ring; and in that
a width of an arc segment is defined by a minimum band width to be verified, and a cumulative width of the two arc segments is defined by a maximum band width to be checked.

A simple device for dimensionally controlling the characteristics of a fastener is thus obtained. Such a device is, firstly, not costly to manufacture by machining or molding in any type of material, is little subject to wear in use, is practically impossible to misadjust, needs no periodic calibration, and can be carried and utilized by any operator who needs to carry out a check before installing a fastener.

The choice of a material with low hardness compared to the material of the fasteners also reduces the risk of creating damage, e.g. a scratch, to the fastener.

The control ring according to the invention may comprise one or more of the following characteristics, given all the technically-possible combinations.

In one form of embodiment, the two adjacent arc segments are notches extending axially inside the tubular body up to the end walls, located between the first extremity and the second extremity.

In another form of embodiment, the two adjacent arc segments are projections extending axially outside the tubular body up to the end walls, beyond the first extremity.

The choice of one or the other of these forms of embodiment, which can be combined on a single ring, is dictated in particular by conditions of use, e.g. lighting conditions and/or reading contrast, or by user comfort preference.

In one form of embodiment, at least one portion of a side wall of a notch or of a projection extends in a plane offset from a radial plane of the body at an angle (α). This results in easier optical reading, given the possible thickness of the ring's body.

In one form of embodiment, the second extremity of the ring has at least one notch extending axially over a portion of the body from said second extremity to a first end wall, one axial length of the notch being defined by a minimum distance to be checked between said second extremity and an axial band extremity arranged on the fastener's shaft.

In one form of embodiment, the second extremity also has at least one second notch extending axially over a portion of the body from said second extremity to a second bottom wall, one axial length of said second notch being defined by a tolerance range of a distance to be checked between said second extremity and an axial band extremity arranged on the fastener's shaft.

In this way, the same benefits are obtained for the controls of the length or end position of the bands as for the check of the bands' widths.

In one form of embodiment, to adjust itself to the shape of the fastener head, the second extremity comprises a conical or flat surface complementing a fastener head bottom, respectively countersunk or protruding.

In one form of embodiment, the second extremity comprises a conical surface and a flat surface alternately complementing a countersunk or protruding fastener head bottom.

To help interpret the controls carried out and reduce the risks of incorrect readings, at least one end or side wall comprises a visual means indicating the acceptance or rejection of the checked dimension.

The visual means is for example a color applied on said wall or a notice applied near said wall.

The invention also concerns a method for controlling a fastener comprising a head and a cylindrical shaft extending along an axis, the shaft comprising at least one band of coating parallel to the axis, the band extending over a circumferential width of the shaft, by means of a control ring of the invention, the method comprising the following steps:
  a) mounting the ring on the fastener cylindrical shaft with clearance;
  b) turning the ring over the circumference of the shaft to align a first edge of a band with a side wall of a first arc segment of the first extremity;
  c) reporting the circumferential width of the band to be compliant if a second edge of the band, opposite the first edge of said band, is included in the second arc segment and is not included in the first arc segment, i.e. if the width of said band is greater than the width of the first arc segment and smaller than the width of the two adjacent arc segments.

The compliance of a width of a band on the fastener head has thus been verified.

In one mode of implementation, the steps b) and c) carried out for one band are repeated for each of the fastener's coating bands, and the fastener is reported as non-compliant if step c) is not verified for at least one coating band.

The full control of a fastener is thus achieved, by simple rotation of the fastener in relation to the ring.

The invention also concerns a method for verifying a fastener comprising a head and a cylindrical shaft extending along an axis, the shaft comprising at least one band of coating parallel to the axis, the band extending over a circumferential width of the shaft, by means of a control ring of the invention, the method comprising the following steps:
  a) mounting the ring on the fastener cylindrical shaft with clearance;
  b) sliding the ring so as to abut the second extremity under the fastener head;
  c) turning the ring over the entire circumference of the shaft;
  d) reporting the fastener as complying with a criterion of maximum length of the bands if none of the bands appears in the first notch during the rotation of the ring.

The compliance of a length of the bands on the fastener shaft has thus been verified.

In one mode of implementation, the method also comprises a step consisting of reporting the fastener as complying with a criterion of minimum length of the bands if the axial extremity of each band appears opposite the second notch.

In one mode of implementation, the second extremity of the ring is placed abutting under a fastener head. The risk of faulty positioning of the ring on the fastener shaft during a band length controls is thus reduced.

BRIEF DESCRIPTION OF THE DRAWINGS

The invention and its various applications will be better understood in reading the following description and examining the figures pertaining thereto. These are presented for information purposes only and are non-limiting of the invention. The figures show:
FIG. 1A: an end-view of a fastener of the prior art to be checked, already described;
FIG. 1B: a side view of a fastener of the prior art to be checked, already described;
FIG. 2: an isometric view of a first embodiment of a control ring;
FIG. 3: an isometric view of a second embodiment of a control ring.

DETAILED DESCRIPTION

Figure 4:
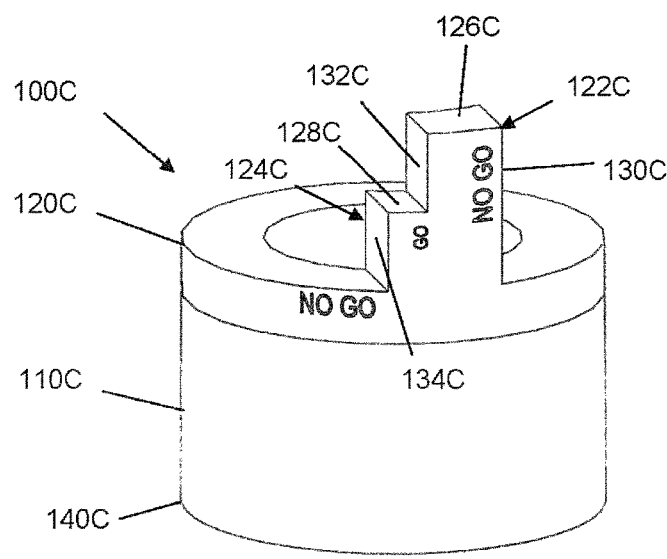
FIG. 4: an isometric view of a third embodiment of a control ring.

FIG. 2 shows a first embodiment of the control ring 100 according to the invention. The control ring 100 comprise a tubular body 110 with an axis of revolution B, fitted with a through hole, exiting at a first extremity 120 of said tubular body and a second extremity 140 opposite the first extremity. The ring is, for example, made of aluminum. The inner diameter of the ring matches the outer diameter of the shaft 14 of the fastener to be checked, to within one tolerance, so that the ring is able to slide without excessive resistance over the shaft 14.

The first extremity 120 of the body comprises two U-shaped notches 122 and 124 extending axially over a portion of the body 110 from the extremity 120 to an end wall 126 and an end wall 128, respectively. The end walls 126 and 128 extend over parallel planes, perpendicular to axis B, and are axially offset from each other. The two notches 122 and 124 are adjacent and have different axial lengths and widths—or arc segments—of different lengths.

The terms "width" and "arc segment" are used interchangeably in the rest of the description and refer to the length of the arc segment covered by the lubrication band 22.

Figure 6:
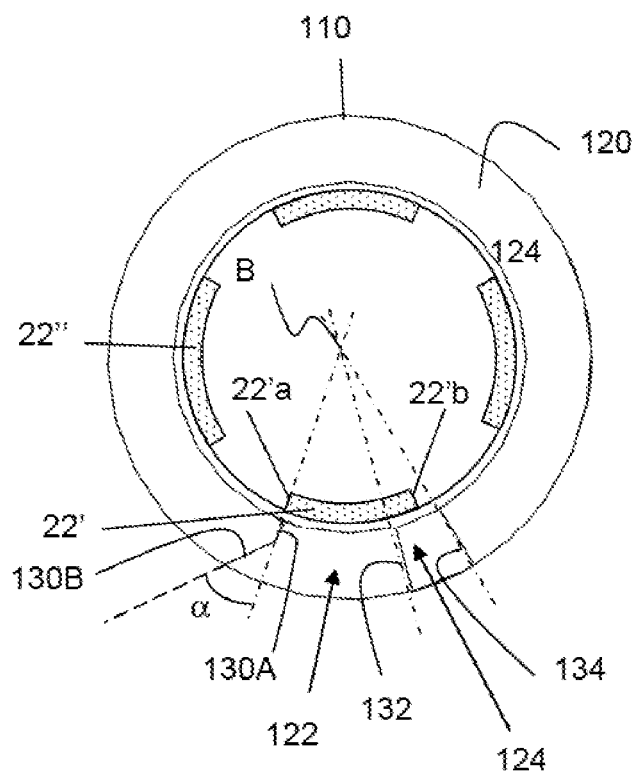
FIG. 6: an end-view of the ring of FIG. 2 placed on the shaft of a fastener to be checked.

The notch 122 comprises two lateral walls 130 and 132 and the end wall 126. The wall 132 is arranged in a radial plane, i.e. a plane extending parallel to a radius of the ring and going through the axis of revolution B of the ring. The wall 130 comprises a portion 130A (FIG. 6, 7) extending over a radial plane, and a beveled portion 130B extending over a plane offset from the radial plane by an angle α (FIG. 6, 7). The bevel makes the visual check easier. In a variant not shown, the entire wall 130 could be beveled. The width of the notch 122 between the lateral walls 130 and 132 matches the minimum permitted width of a band 22. The width of the two notches 122 and 124 between the lateral walls 130 and 134 matches the maximum permitted width of a band 22. The width of the wall 128 between the lateral walls 132 and 134 represents the tolerance range accepted in the design plan of the fastener 10 for the width of the band 22.

The difference in the axial lengths of the notches 122 and 124 is not used to measure an axial dimension of the band 22, but makes it possible to visually differentiate the two minimum and maximum widths represented by the side walls of the notches.

To facilitate the use of the ring, the word "GO" is inscribed on the body 110 under the end wall 128, visually indicating the acceptable tolerance range for the width of the measured band. In a variant, the end wall 128 could include a color, e.g. a green color, visually indicating the acceptable dimensional range.

The second extremity 140 comprises, in this embodiment, a flat surface without notches.

FIG. 3 shows a ring 100B according to a second embodiment of the invention. The ring 100B comprises a body 110B and a first extremity 120B, identical to the first extremity 120 of the first embodiment shown in FIG. 2.

In the example of FIG. 3, the second extremity 140B of the ring 100B comprises a U-shaped notch 142B extending axially over a portion of the body 110B from the extremity 140B to an end wall 144B extending in a plane perpendicular to the axis B of the ring 100B. The notch 142B comprises two lateral walls 146B and 148B and the end wall 144B. The lateral walls 146B and 148B are each arranged in a radial plane. A portion 145B of the body 110B is beveled to facilitate visual inspection.

The notch 142B is only necessary when the band 22 does not extend to the fastener's below-head radius 13, but stops at a precise distance from the below-head radius. In this specific case, the notch 142B extends axially over a distance matching the maximum distance specified in the fastener's design plan between the lower part of the head and the axial extremity of the band 22. The width of the notch 142B must be sufficient to allow the visual check, but is not used to measure the correct width of the coating band.

The second extremity 140B comprises a flat surface 150B designed to come into contact with the bottom of the head of a protruding-head fastener. The lower wall of the extremity 140B comprises a shoulder 152B designed to receive the below-head radius 13 of a protruding-head fastener.

To facilitate the use of the ring, the word "GO" is inscribed on the body 110B near the side wall 146B, near the second extremity 140B, visually indicating the acceptable dimensional range for the measured length. In a variant, the side wall 146B could include a color, e.g. a green color, visually indicating the acceptable dimensional range for the measured length.

FIG. 4 shows a ring 100C according to a third embodiment of the invention. The ring 100C comprises a body 110C, a first extremity 120C and a second extremity 140C. Unlike the band shown in FIG. 2, the first extremity 120C of this embodiment does not have a U-shaped notch, but comprises two U-shaped protrusions 122C and 124C, also adjacent, extending axially beyond the extremity 120C up to an end wall 126C and an end wall 128C, respectively.

The protrusion 122C comprises two lateral walls 130C and 132C and the end wall 144B. The wall 132C is arranged in a radial plane. The width of the protrusion 122C between the lateral walls 130C and 132C matches the minimum permitted width of a band 22. The width of the two protrusions 122C and 142C between the lateral walls 130C and 134C matches the maximum permitted width of a band 22. The width between the lateral walls 132C and 134C represents the tolerance accepted in the design plan of the fastener 10.

The difference in the lengths of the protrusions 122C and 124C in the axial direction is not used to measure an axial dimension of the band 22, but makes it possible to visually differentiate the two minimum and maximum widths represented by the side walls of the protrusions.

To facilitate the use of the ring, the word "GO" is inscribed on the body 110C of the ring under the end wall 128C, visually indicating the acceptable dimensional range for the measured width. In a variant, the end wall 128C could include a color, e.g. a green color.

The notices "NO GO" indicating the rejection of the fastener are inscribed near the side wall 130C and under the extremity 120C, near the wall 134C, visually indicating the unacceptable dimensional range of the measured width. In a variant, the flat surface of the extremity 120C and the side wall 130B could include a color, e.g. a red color, visually indicating the unacceptable dimensional range for the measured width. These are optional and the gauge may comprise only the "GO" indication, only a green color, only a "NO GO" indication, or only a red color.

The second extremity 140C of the ring 110C comprises a flat surface with no notch. In a variant not shown, it may comprise a notch 142B as shown in FIG. 3 or a series of notches 142D, 152D and 162D, represented in FIG. 5 and described below.

Figure 5:
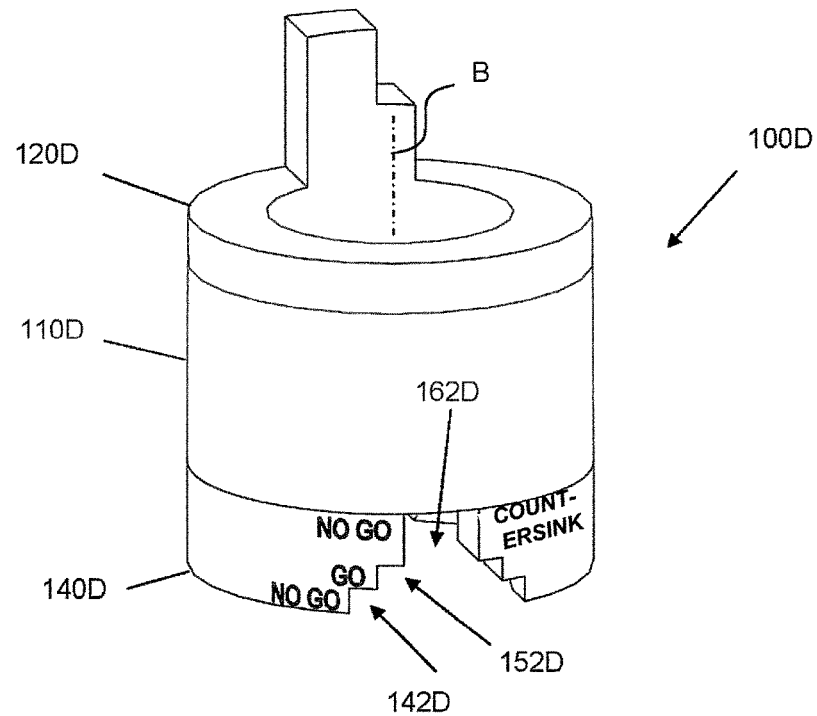
FIG. 5: an isometric view of a fourth embodiment of a control ring.

FIG. 5 shows a ring 100D according to a fourth embodiment of the invention. The ring 100D comprises a body 110D and a first extremity 120D, identical to the first extremity 120C of the ring 100C shown in FIG. 4. In a variant, it may be identical to the first extremity 120C of the ring 100C.

In the example of FIG. 5, the second extremity 140D of the ring 100D comprises a series of three successive U-shaped notches 142D, 152D, 162D, extending axially over a portion of the body 110D from the extremity 140D respectively towards three end walls extending in planes perpendicular to the axis B and offset axially from one another. The three notches 142D, 152D and 162D are symmetrical in relation to a radial plane going through their middle, the middle radial planes of the three notches being the one and the same.

Each notch comprises two lateral walls and one end wall. The lateral walls are each arranged in a radial plane. The closer the end walls are to the extremity 140D, the larger the widths of the notches are. Using successive and adjacent notches of different widths makes it possible to physically mark the tolerance range by shifting the lateral walls of each notch in the circumferential direction.

The axial length of the first notch 142D represents the minimum distance that needs to separate the below-head radius 13 of a fastener from the axial extremity of a band 22.

The axial length of the second notch 152D and the axial length of the first notch 142D thus represent the tolerance range for the distance between the below-head radius 13 of a fastener and the axial extremity of a band 22.

The third notch 162D extends axially beyond a distance greater than the maximum distance specified in the design plan of the fastener between the lower part of the head 13 and the axial extremity of the band 22.

The widths of the notches 142D, 152D and 162D must be sufficient to allow visual checking, but are not used to measure the width of a lubrication band, to prevent inspection errors.

To facilitate the use of the ring, the word "GO" is inscribed on the body 110D near the side wall of the second notch 152D, visually indicating the acceptable tolerance range for the length of the measured band. In a variant, the side wall of the second notch could include a green color.

The ring may include other visual indications, such as the word "COUNTERSUNK" to indicate that the ring is suitable for a countersunk-head fastener, a "NO GO" indication near the lateral walls of the notches 142D and 162D to indicate that a band whose axial extremity appears within these ranges is outside the tolerances. In a variant, the "NO GO" indication could be replaced by applying red color to the lateral walls of these notches.

The measurement method for the dimensions of a coating band 22 on a shaft of a fastener 10 using a ring 100, 100B or 100C or 100D will now be described with reference to FIGS. 6 and 7.

Figure 7:
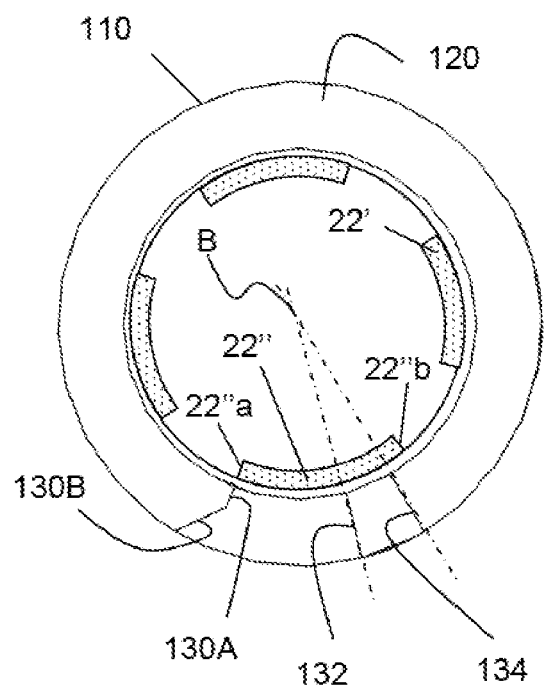
FIG. 7: another end-view of the ring of FIG. 2 placed on the shaft of a fastener to be checked, with the shaft having turned 90° anticlockwise in relation to FIG. 6.

FIGS. 6 and 7 show the measurement of a coating band 22 of a fastener 10 by means of a ring 100, shown in FIG. 2. The ring 100 is shown in top view and the fastener shaft is shown in cross-section. The lubrication bands 22 are shown schematically and are greatly magnified.

The method comprises the following steps, which may be carried out in a different order, since non-compliance of one dimension leads to the fastener being non-compliant.

The first step consists of mounting the ring 100 with clearance on the cylindrical shaft 14 of a fastener to be checked.

The operator then turns the ring over the entire circumference of the shaft so that a band 22' to be checked appears in the two notches 122 and 124. To do this, the operator aligns the wall 130A of the notch 122 with an extremity 22'*a* of the band.

In the case of band 22', the second extremity 22'*b* of the band appears between the wall 132 of the notch 122 and the wall 134 of the second notch 124. The width of the band 22' is therefore within the tolerance range such as defined by the width of the end wall 128, since it is both wider than the required minimum width and less wide than the permitted maximum width.

The width of the band 22' being in compliance, the operator turns the ring 100 on the shaft 14 of the fastener to inspect the adjacent coating band 22". This position is shown in FIG. 7.

As before, the operator aligns the wall 130A of the notch 122 with one extremity 22"*a* of the band.

In the case of band 22", the second extremity 22"*b* of the band does not appear between the wall 132 of the notch 122 and the wall 134 of the second notch 124. The width of the band 22" is therefore outside the tolerance range defined by the width of the end wall 128, since it is wider than the maximum permitted width. Therefore, it does not comply with the design plan and the fastener 14 is reported as non-compliant.

If the second extremity 22"*b* of the band 22" were to end in the width of the notch 122 before the wall 132, it would also be deemed non-compliant, as it would be smaller than the minimum permitted width. The fastener 14 would therefore also be deemed to be non-compliant.

If all the bands 22 are deemed to be compliant, the fastener 14 checked is also deemed to comply with the design plan.

Using the gauge 100C to measure the compliance of the width of the bands 22 is similar to that previously described, with the difference that the operator must align the extremity 22'*b* or 22"*b* of a band with the wall 130C of the protrusion 122C and check if the extremity 22'*a* or 22"*a* of the band appears in the width of the wall 128C of the second protrusion. If the extremity 22'*a* or 22"*a* does not appear, either because the band is too narrow or because it is too wide, the band is not compliant and the fastener is deemed to be non-compliant.

If the fastener 14 comprises bands 22 that do not extend over the entire length of the shaft 14, but extend only over a portion of the shaft, away from the below-head radius 13 of the fastener 10, the ring 100B or 100D is required. To do this, the operator mounts, for example, the ring 100B on the cylindrical shaft 14 of the fastener and slides the ring until the second extremity 140B of the body is abutting under the fastener head. If the head of the fastener 10 is protruding, the second extremity 140B requires a flat portion so as to abut under the protruding head 12. If the head of the fastener 10 is countersunk, the second extremity 140B requires a conical portion.

The operator then turns the ring over the entire circumference of the shaft to check visually if each band 22 appears in the notch 142B.

If one band 22 does not appear, the fastener is then reported as non-compliant, as the band 22 is too far from the bottom of the head and its length does not comply with the plan. If all the bands appear, the fastener is reported as complying with the plan.

The notch 142B only checks the maximum distance between a below-head radius 13 and an axial extremity of a band 22. If the design plan of the fastener 10 specifies that the bands 22 must be at a distance included in a tolerance range for the below-head radius, then the operator will use the ring 100D shown in FIG. 5.

The inspection method is identical to the one previously described, except that the axial extremity of a band 22 must appear opposite the side wall of the second notch 152D to be deemed compliant. If the axial extremity of a band 22 appears opposite the third notch 162D, the band is too short. If the axial extremity of a band 22 appears opposite the first notch 142D, the band is too long. In both these cases, the length of the band does not comply with the plan and the fastener is deemed to be non-compliant.

Advantageously, a ring will comprise a means of verifying the width of a band at the first extremity and two means of checking the length of a band at the second extremity, one suitable for a countersunk head fastener, the other suitable for a protruding head fastener. Thus, a single ring makes it possible to realize several controls quickly. The ring 100B or 100D can be used to inspect fasteners with no requirement for the axial band length, using only the visual means of checking the width of a band.

Such a ring is simple to manufacture, little subject to wear since the lateral walls are not subject to friction, and simple to use thanks to the GO/NO GO markings or the color codes applied near or on the control walls.

Of course, this ring can be used for measuring widths and lengths of bands of any type of coating, and not only lubrication bands.

The invention claimed is:

1. Control ring for a fastener comprising an enlarged head and a cylindrical shaft extending along an axis, the shaft comprising at least one band of coating parallel to the axis, the band extending over a circumferential width, the ring comprising a cylindrical tubular body extending along an axis of revolution between a first extremity and a second extremity, characterized in that the first extremity comprises two adjacent arc segments, each arc segment having an end wall extending in a plane perpendicular to the axis of revolution of the ring, the planes of the two walls not being one and the same and being axially offset from the first extremity; and each arc segment comprises at least one side wall extending over a radial plane going through the axis of revolution of the ring; and in that a width of an arc segment is defined by a minimum band width to be checked, and a cumulative width of the two arc segments is defined by a maximum band width to be checked.

2. Control ring according to claim 1, wherein the two adjacent arc segments are notches extending axially inside the tubular body up to the end walls, located between the first extremity and the second extremity.

3. Control ring according to claim 2, wherein at least one portion of a side wall of a notch or of a projection extends in a plane offset from a radial plane of the body at an angle.

4. Control ring according to claim 1, wherein the two adjacent arc segments are projections extending axially outside the tubular body up to the end walls, beyond the first extremity.

5. Control ring according to claim 1, wherein the second extremity of the ring has at least one notch extending axially over a portion of the body from said second extremity to a first end wall, one axial length of the notch being defined by a minimum distance to be checked between said second extremity and an axial band extremity arranged on the fastener's shaft.

6. Control ring according to claim 5, wherein the second extremity also has at least one second notch extending axially over a portion of the body from said second extremity to a second bottom wall, one axial length of said second notch being defined by a tolerance range of a distance to be checked between said second extremity and an axial band extremity arranged on the fastener's shaft.

7. Control ring according to claim 5, wherein the second extremity comprises a conical or flat surface complementing a fastener head bottom, respectively countersunk or protruding.

8. Method for controlling a fastener comprising: a head and a cylindrical shaft extending along an axis, the shaft comprising at least one band of coating parallel to the axis, the band extending over one length, by means of a control ring according to claim 5, the method comprising the following steps:
(a) mounting the ring on the fastener cylindrical shaft;
(b) sliding the ring so as to abut the second extremity under the fastener head;
(c) turning the ring over the entire circumference of the shaft;
(d) reporting the fastener as complying with a criterion of maximum length of the bands if none of the bands appears in the first notch during the rotation of the ring.

9. Method for controlling a fastener according to claim 8, comprising a step consisting of reporting the fastener as complying with a criterion of minimum length of the bands if the axial extremity of each band appears opposite the second notch.

10. Method for controlling a fastener according to claim 8, wherein the second extremity of the ring is placed abutting under a head of the fastener.

11. Control ring according to claim 1, wherein at least one end or side wall comprises a visual means indicating the acceptance or rejection of the checked dimension.

12. Control ring according to claim 11, wherein the visual means is a color applied on said wall or a notice applied near said wall.

13. Method for controlling a fastener comprising a head and a cylindrical shaft extending along an axis, the shaft comprising at least one band of coating parallel to the axis, the band extending over a circumferential width of the shaft, by means of a control ring according to claim 1, the method comprising the following steps:
(a) mounting the ring on the fastener cylindrical shaft with clearance;
(b) turning the ring over the circumference of the shaft to align a first edge of a band with a side wall of a first arc segment of the first extremity;
(c) reporting the circumferential width of the band to be compliant if a second edge of the band, opposite the first edge of said band, is included in the second arc segment and is not included in the first arc segment, i.e. if the width of said band is greater than the width of the first arc segment and smaller than the width of the two adjacent arc segments.

14. Method for controlling a fastener according to claim 13, consisting of repeating steps (b) and (c) from claim 13 for each of the fastener's coating bands, and reporting the fastener as non-compliant if step (c) is not verified for at least one coating band.

* * * * *